(12) United States Patent
Ray et al.

(10) Patent No.: US 8,380,888 B2
(45) Date of Patent: Feb. 19, 2013

(54) SYSTEM AND METHOD FOR DETERMINING PRINTER HEALTH

(75) Inventors: Elton Tarik Ray, Lakeville, NY (US); Brian Robert Pierson, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 341 days.

(21) Appl. No.: 12/193,516

(22) Filed: Aug. 18, 2008

(65) Prior Publication Data
US 2010/0042736 A1 Feb. 18, 2010

(51) Int. Cl.
*G06F 3/00* (2006.01)
(52) U.S. Cl. .......................................................... 710/15
(58) Field of Classification Search ..................... 710/15
See application file for complete search history.

(56) References Cited

U.S. PATENT DOCUMENTS

| | | | |
|---|---|---|---|
| 5,768,495 A | 6/1998 | Campbell et al. | |
| 5,784,622 A | 7/1998 | Kalwitz et al. | |
| 5,848,318 A * | 12/1998 | Okimoto | 399/8 |
| 6,353,899 B1 | 3/2002 | Martin et al. | |
| 6,400,462 B1 | 6/2002 | Hille | |
| 6,763,482 B2 | 7/2004 | Bernklau-halvor | |
| 7,576,879 B2 * | 8/2009 | Ohara | 358/1.15 |
| 2006/0069691 A1 * | 3/2006 | Kawai | 707/100 |
| 2008/0278755 A1 | 11/2008 | Martin | |

* cited by examiner

*Primary Examiner* — Chun-Kuan Lee
(74) *Attorney, Agent, or Firm* — Fox Rothschild LLP

(57) ABSTRACT

A system and method for determining whether a printing device is operating properly may include determining, by a computing device, whether a protocol is supported by a printing device. Using the supported protocol, implementation information may be transmitted to the printing device. Response information may be received from the printing device. A result based on the response information may be reported. The result may be indicative of the operation of the protocol on the printing device.

18 Claims, 3 Drawing Sheets

SYSTEM AND METHOD FOR DETERMINING PRINTER HEALTH

BACKGROUND

The disclosed embodiments relate generally to methods and systems for performing diagnostic assessments of networked devices.

Printing devices are ubiquitously associated with computing devices in a networked environment. A networked environment allows a computing device to communicate with a printing device regardless of the physical distance between the printing device and the computing device.

A printing device and a computing device communicate using one or more protocols. Each protocol requires one or more actions to be performed by the printing device. For example, a file transfer protocol transfers data from one device to another device, such as transferring data from a computing device to a printing device.

Over time, problems can occur with a printing device. These problems can range in complexity from a simple paper jam to a more severe mechanical failure. In order to determine the cause of a more severe problem on a printing device, a technician could be requested to troubleshoot the device. Troubleshooting operations can be performed remotely to reduce cost and save time. However, when software problems occur within a printing device, it can be difficult to determine whether the source of the problem is the application software or a mechanical failure.

SUMMARY

In an embodiment, a method for determining whether a printing device is operating properly may include determining, by a computing device, whether a protocol is supported by a printing device. Implementation information may be transmitted to the printing device using the supported protocol. Response information may be received from the printing device. A result based on the response information may be reported. The result may be indicative of the operation of the protocol on the printing device.

In an embodiment, reporting a result may include reporting that the supported protocol is properly functioning. In an embodiment, reporting a result may include reporting that the supported protocol is not properly functioning. Reporting a result may include displaying the result on the computing device and/or storing the result in a log file.

In an embodiment, status information pertaining to the printing device may be determined. It may be determined whether a protocol is supported when a response to a command is received. It may be determined whether a protocol is supported after a time interval. It may be determined whether a protocol is supported upon detection of a new printing device. The protocol may include, but is not limited to, a file transfer protocol (FTP), an internet printing protocol (IPP), a line printer daemon protocol (LPR), a simple network management protocol (SNMP), a remote procedure call (RPC) status protocol and an extensible markup language (XML) status protocol. In an embodiment support information may be transmitted to a port type and port number associated with the protocol.

In an embodiment, a system for determining whether a printing device is operating properly may include a processor and a computer readable storage medium in communication with the processor. The computer readable storage medium may contain one or more programming instructions executed by the processor for determining, by a computing device, whether a protocol is supported by a printing device, transmitting implementation information to the printing device using the supported protocol, receiving response information from the printing device, and reporting a result based on the response information. The result may be indicative of the operation of the protocol on the printing device.

In an embodiment, a method for determining whether a resource is operating properly may include determining, by a computing device, whether a protocol is supported by a resource. Implementation information may be transmitted to the resource using the supported protocol. Response information may be received from the resource. A result based on the response information may be reported. The result may be indicative of the operation of the protocol on the resource.

In an embodiment, reporting a result may include reporting that the supported protocol is properly functioning. In an embodiment, reporting a result may include reporting that the supported protocol is not properly functioning. Reporting a result may include displaying the result on the resource. In an embodiment, the status information pertaining to the resource may be determined. In an embodiment support information may be transmitted to a port type and port number associated with the protocol. In an embodiment, it may be determined whether a protocol is supported after a time interval. In an embodiment, it may be determined whether a protocol is supported upon detection of a new printing device.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Before the present methods and systems are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Unless defined otherwise, all technical and scientific terms used herein have the same meanings as commonly understood by one of ordinary skill in the art. As used herein, the term "comprising" means "including, but not limited to."

A "computing device" refers to a system that processes data to perform one or more functions. A computing device may be any processor-based device such as, for example, a server, a personal computer, a personal digital assistant, a web-enabled phone, a smart terminal, a dumb terminal and/or any other electronic device capable of processing data and performing functions.

A "resource" refers to a device that generates an electronic document either by itself or in coordination with other resources. A resource may include, but is not limited to, a printing device, a multifunction device, a router, a web server and/or other devices.

A "printing device" is an electronic device that is capable of receiving commands, printing text and/or images on a substrate and/or scanning a document. Printing devices may include, but are not limited to, network printers, production printers, copiers, faxes, other devices using ink or toner, or scanners. Printing devices may also perform a combination of functions, such as printing/scanning/faxing. Printing devices performing a combination of functions may be referred to as multifunctional devices.

A "protocol" is a set of rules or guidelines used for communicating between networked computing devices and/or resources. For example, a protocol may include a set of rules that define a data compression method, an error checking method and/or how a computing device indicates that a message was sent and/or received.

"Implementation information" refers to data sent from a computing device to a resource to determine whether a protocol is properly functioning on the resource.

"Response information" refers to data received from a resource by a computing device to determine whether a protocol is properly functioning on the resource.

"Support information" refers to data sent from a computing device to a resource to determine whether a protocol is supported.

Figure 1:
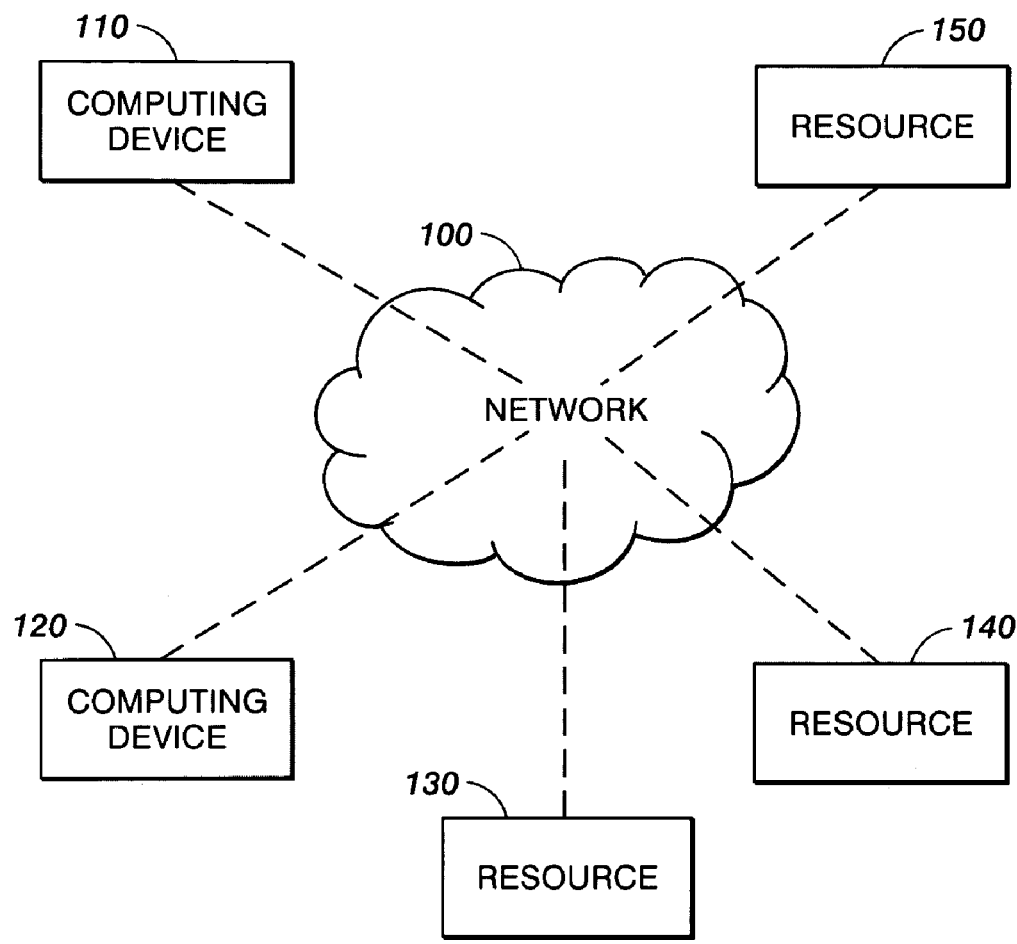
FIG. 1 illustrates a block diagram of an exemplary system for determining whether a resource is operating properly according to an embodiment.

FIG. 1 illustrates a block diagram of an exemplary system for determining whether a resource is operating properly according to an embodiment. As shown in FIG. 1, the system may include a network 100, one or more computing devices 110, 120 and one or more resources 130, 140, 150. A network 100 may include, but is not limited to, a local area network (LAN), a wide area network (WAN), the Internet, a universal serial bus (USB) network, a Bluetooth network and/or any other communications network. The one or more computing devices 110, 120 may communicate with one or more of the resources 130, 140, 150 through the network 100.

Figure 2:
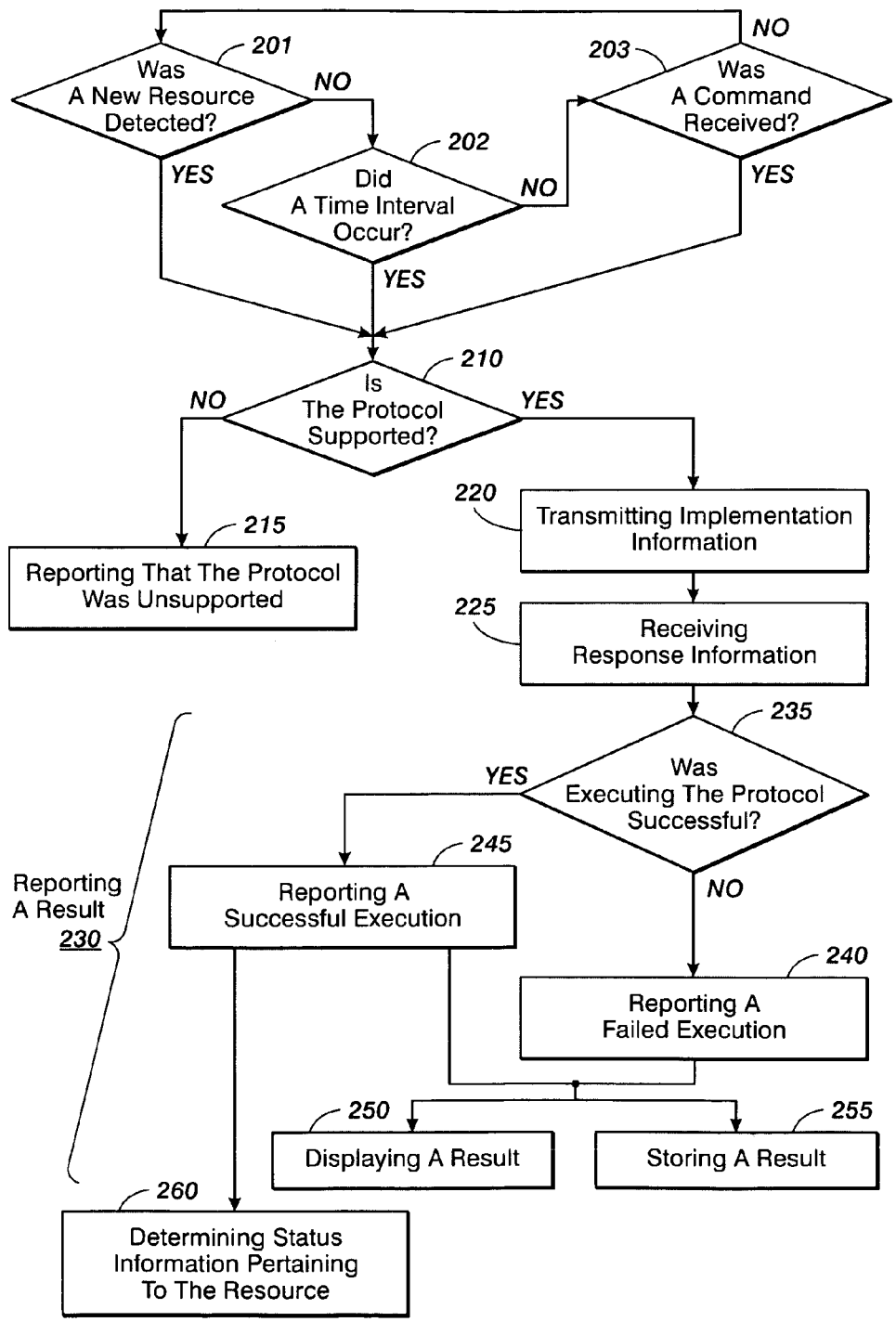
FIG. 2 depicts a flowchart of an exemplary method for determining whether a resource is operating properly according to an embodiment.

FIG. 2 depicts a flowchart of an exemplary method of determining whether a resource is operating properly according to an embodiment. A computing device may determine 210 whether a protocol is supported by a resource.

In an embodiment, a computing device may determine whether a protocol is supported by a resource when a new resource is detected 201. The new resource may be detected by the computing device. In an embodiment, determining whether a protocol is supported by a new resource may be used to ensure proper operation of the new resource. In an embodiment, determining whether a protocol is supported by a new resource may be used to ensure that the new resource is properly installed in the system.

In an embodiment, if a new resource is not detected, a computing device may determine whether a protocol is supported by a resource after a time interval 202. In an embodiment, the time interval may reoccur periodically or intermittently.

In an embodiment, if a time interval has not occurred, a computing device may determine whether a protocol is supported by a resource when a command is received 203. In an embodiment, the command may be received by the computing device from a user and/or a remote field service representative. In an embodiment, the computing device may be at a location that is remote from the resource. The order of operations performed by the computing device discussed in the present embodiment is non-limiting and the operations may be performed in any order.

The computing device may determine 210 which protocols are supported by the resource. In an embodiment, determining 210 whether a protocol is supported by a resource may be used to determine whether the source of the problem is the application software or a mechanical failure. By determining 210 which protocols are supported by a resource and using the protocols to interact with the resource, the computing device may determine if a fault occurred because of a communication error between the resource and the computing device or an error within the resource.

In order for the computing device to determine 210 which protocols are supported by the resource, the computing device may store a list of protocols used to poll each resource. In an embodiment, the computing device may receive a list containing only the protocols which are available at the resource. In an alternate embodiment, the computing device may attempt to communicate with a resource using one or more protocols from a static list. If the computing device attempts to communicate with the resource using a protocol which is not supported by the resource, then the resource may not respond to the request, and the computing device may continue with the next protocol in the list.

In an embodiment, the one or more protocols used for printing and/or status information may include, but are not limited to, file transfer protocol (FTP), internet printing protocol (IPP), secure IPP, line printer daemon protocol (LPR), secure LPR, simple network management protocol (SNMP), remote procedure call (RPC) status protocol, extensible markup language (XML) status protocol and/or other networking protocols.

In an embodiment, the computing device may determine 210 whether the protocol is supported by transmitting support information to a port type and port number associated with the protocol. The computing device may use the port number to determine the type of port and one or more protocols associated with the port. In an embodiment, the computing device may receive an indication of the type of port (for example, UDP or TCP) before interacting with the resource. In an embodiment, a port type may be well known and may include a dedicated port number for a particular protocol. In an embodiment, the protocol may be accessed via a combination of a port number and a port type. For example, a computing device may recognize that when it connects on port 80 with protocol type TCP, the computing device will be communicating with a Hypertext Transfer Protocol (HTTP) server.

In an embodiment, the protocol may be unsupported by a resource. If the protocol is unsupported, the system may report 215 that the protocol is not supported by the resource. However, if the protocol is supported by the resource, then the computing device may transmit 220 implementation information to the resource. Implementation information may use the supported protocol to transmit information to the resource. The implementation information may include, but is not limited to, codes and commands which may use the supported protocol.

The computing device may receive 225 response information from the resource. In an embodiment, the response information may include information from the resource using the protocol. In an embodiment, the response information may be used to determine whether the protocol is properly functioning.

In an embodiment, a result may be reported 230 by the computing device. The reported result may be indicative of the operation of the protocol on the printing device. In an embodiment, a part of the response information may be reported. In an embodiment, the reported result may be determined by the computing device. The reported result from the computing device may include a pass/fail determination of the protocol based on the response information. The computing device may determine if the protocol functioned properly 235 on the resource. If the protocol did not function properly on the resource, then a failure may be reported 240. If the protocol functioned properly on the resource, then a success may be reported 245.

In an embodiment, the result may be reported by displaying 250 the results on the computing device's display screen. In an embodiment, the result may be stored 255 in at least one log file. In an embodiment, a log file may include results from multiple resources. In an embodiment, a plurality of log files may each include one or more results for a corresponding resource.

In an embodiment, a log file containing results for a resource may be provided to a field service representative at a remote computing device. Because the functionality of a protocol may be associated with one or more problems, the testing of the functionality of the protocols may reduce the number of potential causes of failure. For example, by receiving a result indicating a queue protocol functioned properly, a user may determine that the resource does not have a problem related to its queuing system. As such, a list documenting properly functioning and failed functioning protocols may be an efficient way to allow a user or field service representative to determine the cause of a resource error.

In an embodiment, if the computing device determines that a protocol on the resource is functioning, then status information pertaining to the resource may be determined 260. The status information may be analyzed to determine whether internal problems exist. In an embodiment, the status information may pertain to the operation of both hardware and software. For example, the status information may determine whether error flags are set inside the resource.

Figure 3:
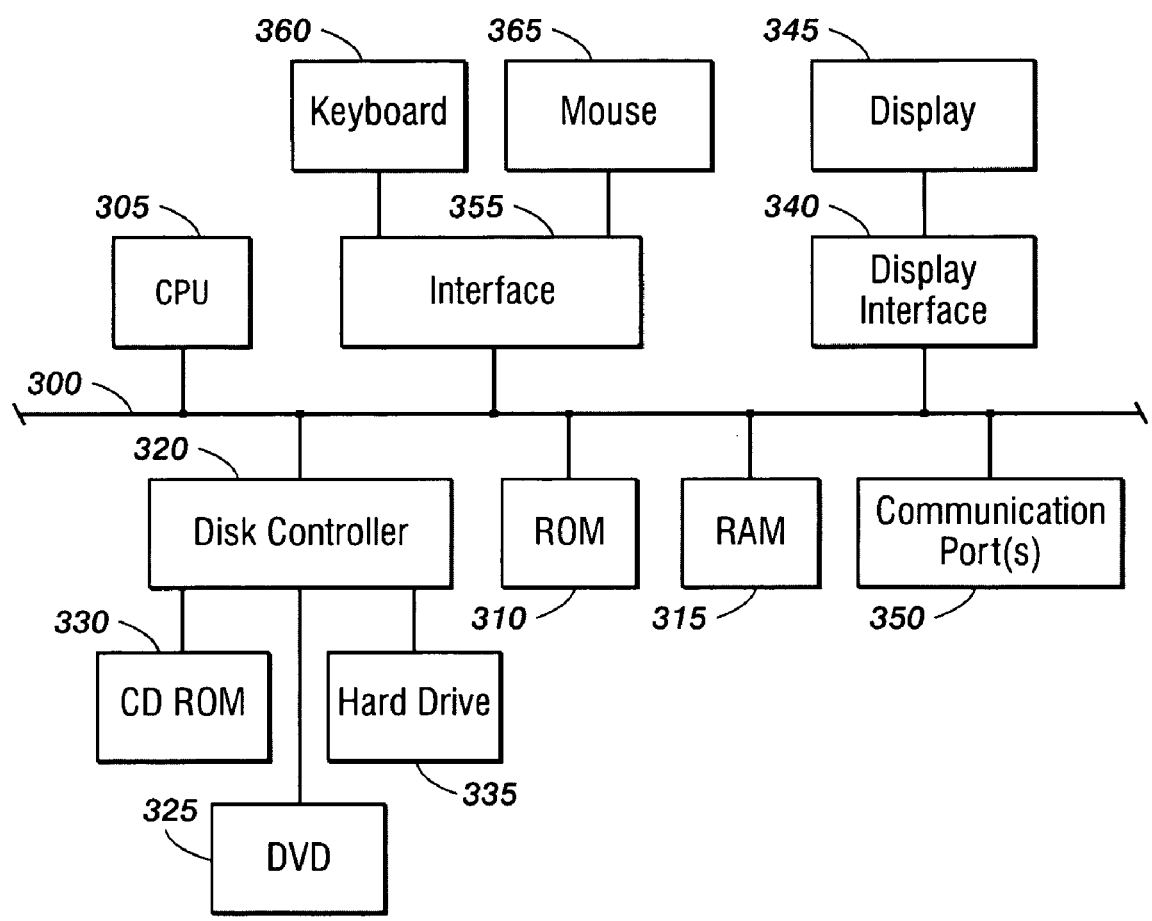
FIG. 3 depicts a block diagram of an exemplary system that may be used to contain or implement program instructions according to an embodiment.

FIG. 3 depicts a block diagram of an exemplary system that may be used to contain or implement program instructions according to an embodiment. Referring to FIG. 3, a bus 300 serves as the main information highway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices or storage media.

A disk controller 320 interfaces with one or more optional disk drives to the system bus 300. These disk drives may include, for example, external or internal DVD drives 325, CD ROM drives 330 or hard drives 335. As indicated previously, these various disk drives and disk controllers are optional devices.

Program instructions may be stored in the ROM 310 and/or the RAM 315. Optionally, program instructions may be stored on a computer readable storage medium, such as a hard drive, a compact disk, a digital disk, a memory or any other tangible recording medium.

An optional display interface 340 may permit information from the bus 300 to be displayed on the display 345 in audio, graphic or alphanumeric format. Communication with external devices may occur using various communication ports 350.

In addition to the standard computer-type components, the hardware may also include an interface 355 which allows for receipt of data from input devices such as a keyboard 360 or other input device 365 such as a mouse, remote control, touch pad or screen, pointer and/or joystick.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for determining whether a printing device is operating properly comprising:
    determining, by a computing device, whether a plurality of protocols are supported by the printing device, comprising:
        identifying the plurality of protocols from a list stored at the computing device, wherein each identified protocol defines a specific and unique function of the printing device, and
        for each of the identified plurality of protocols, polling the printing device to determine whether the protocol is supported by the printing device, wherein the polling comprises transmitting support information to a port type and port number of the printing device, the port type and port number defined by the identified protocol;
    for each of the supported protocols, transmitting implementation information to the printing device using each of the supported protocols, wherein the implementation information comprises commands instructing the printing device to perform the specific and unique function defined by a corresponding supported protocol;
    receiving response information from the printing device;
    for each of the supported protocols, determining if the printing device performed the specific and unique function defined by the corresponding supported protocol, resulting in a pass/fail determination; and
    for each of the supported protocols, reporting a result based on the response information and the pass/fail determination, wherein the result is indicative of the operation of the supported protocol on the printing device and whether an identified fault at the printing device is a result of a communication error or an error within between the computing device and the printing device.

2. The method of claim 1 wherein reporting the result comprises:
    reporting that the one or more supported protocols are properly functioning.

3. The method of claim 1 wherein reporting the result comprises:
    reporting that the one or more supported protocols are not properly functioning.

4. The method of claim 3 further comprising:
    determining status information pertaining to the printing device.

5. The method of claim 1 wherein reporting the result comprises:
    displaying the result on the computing device.

6. The method of claim 1, further comprising:
    storing the result in a log file.

7. The method of claim 1 wherein determining whether the plurality of protocols are supported comprises:
    determining whether the plurality of protocols are supported when a response to a command is received.

8. The method of claim 1 wherein determining whether the plurality of protocols are supported comprises:

determining whether the plurality of protocols are supported after a time interval.

9. The method of claim 1 wherein determining whether the plurality of protocols are supported comprises:
determining whether the plurality of protocols are supported upon detection of a new printing device.

10. The method of claim 1 wherein the plurality of protocols comprise one or more of the following:
file transfer protocol (FTP), internet printing protocol (IPP), line printer daemon protocol (LPR), simple network management protocol (SNMP), remote procedure call (RPC) status protocol, and extensible markup language (XML) status protocol.

11. A system for determining whether a printing device is operating properly, comprising:
a processor; and
a computer readable storage medium in communication with the processor, wherein the computer readable storage medium contains one or more programming instructions executed by the processor for:
determining, by a computing device, whether a plurality of protocols are supported by the printing device, comprising:
identifying the plurality of protocols from a list stored at the computing device, wherein each identified protocol defines a specific and unique function of the printing device, and
for each of the identified plurality of protocols, polling the printing device to determine whether the protocol is supported by the printing device, wherein the polling comprises transmitting support information to a port type and port number of the printing device, the port type and port number defined by the identified protocol;
for each of the supported protocols, transmitting implementation information to the printing device using each of the supported protocols, wherein the implementation information comprises commands instructing the printing device to perform the specific and unique function defined by a corresponding supported protocol;
receiving response information from the printing device;
for each of the supported protocols, determining if the printing device performed the specific and unique function defined by the corresponding supported protocol, resulting in a pass/fail determination; and
for each of the supported protocols, reporting a result based on the response information and the pass/fail determination, wherein the result is indicative of the operation of the supported protocol on the printing device and whether an identified fault at the printing device is a result of a communication error or an error within between the computing device and the printing device.

12. A method for determining whether a resource is operating properly comprising:
determining, by a computing device, whether a plurality of protocols are supported by the resource, comprising:
identifying the plurality of protocols from a list stored at the computing device, wherein each identified protocol defines a specific and unique function of the printing device, and
for each of the identified one or more protocols, polling the resource to determine whether the protocol is supported by the resource, wherein the polling comprises transmitting support information to a port type and port number of the resource, the port type and port number defined by the identified protocol;
for each of the supported protocols, transmitting implementation information to the resource using each of the supported protocols, wherein the implementation information comprises commands instructing the resource to perform the specific and unique function defined by a corresponding supported protocol;
receiving response information from the resource;
for each of the supported protocols, determining if the resource performed the specific and unique function defined by the corresponding supported protocol, resulting in a pass/fail determination; and
for each of the supported protocols, reporting a result based on the response information and the pass/fail determination, wherein the result is indicative of the operation of the supported protocol on the resource and whether an identified fault at the printing device is a result of a communication error or an error within the resource.

13. The method of claim 12 wherein reporting the result comprises:
reporting that the one or more supported protocols are properly functioning.

14. The method of claim 12 wherein reporting the result comprises:
reporting that the one or more supported protocols are not properly functioning.

15. The method of claim 14 further comprising:
determining status information pertaining to the resource.

16. The method of claim 12 wherein reporting the result comprises:
displaying the result on the computing device.

17. The method of claim 12 wherein determining whether the plurality of protocols are supported comprises:
determining whether the plurality of protocols are supported after a time interval.

18. The method of claim 12 wherein determining whether the plurality of protocols are supported comprises:
determining whether the plurality of protocols are supported upon detection of a new printing device.

* * * * *